UNITED STATES PATENT OFFICE.

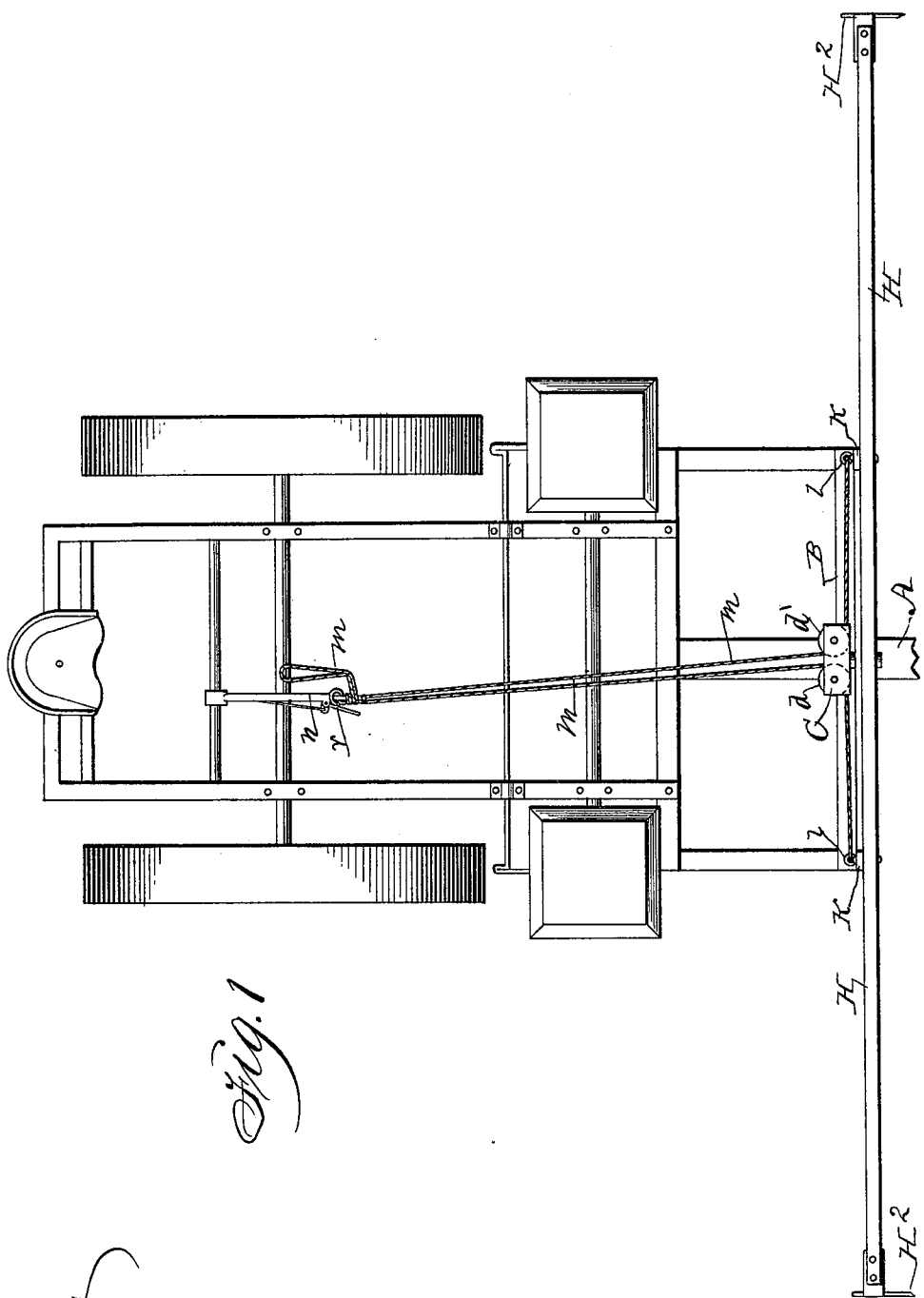

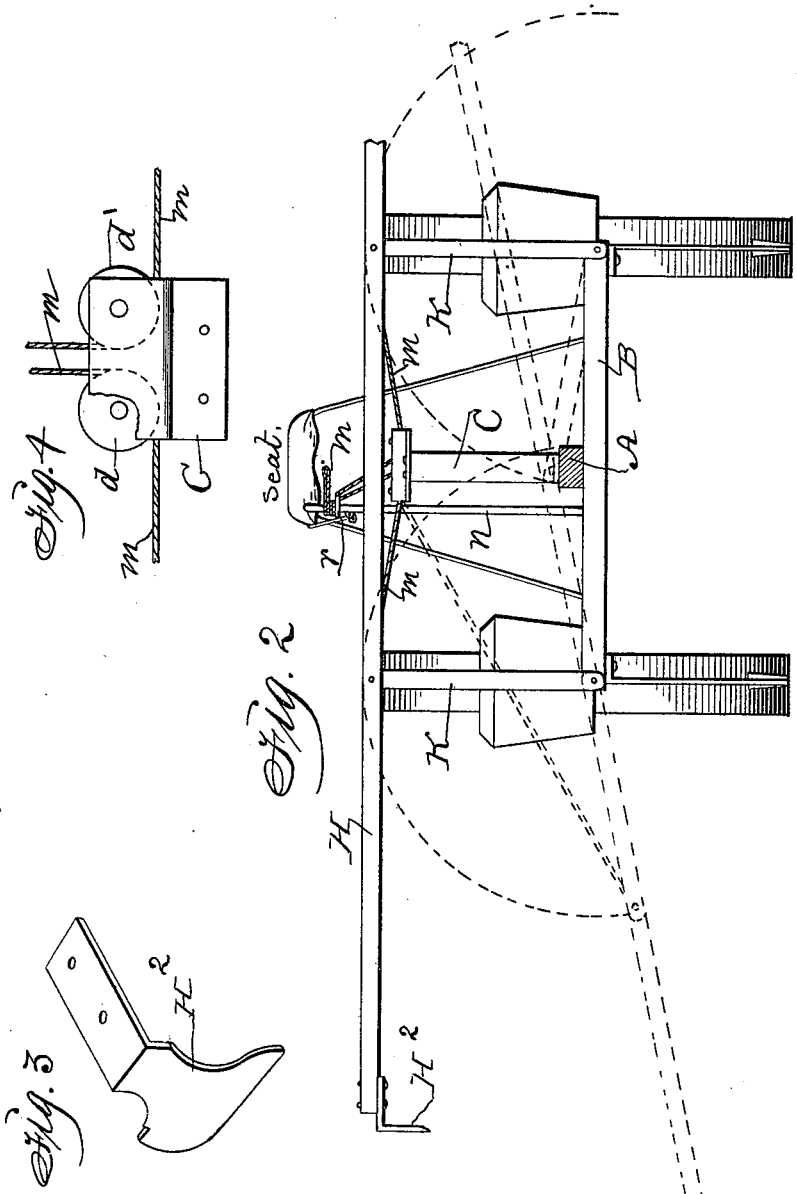

LEROY J. LINDSAY, OF SEYMOUR, IOWA, ASSIGNOR OF ONE-HALF TO J. T. PHILLIPS, OF SAME PLACE.

MARKER FOR CORN-PLANTERS.

SPECIFICATION forming part of Letters Patent No. 672,101, dated April 16, 1901.

Application filed December 10, 1900. Serial No. 39,285. (No model.)

*To all whom it may concern:*

Be it known that I, LEROY J. LINDSAY, a citizen of the United States, residing at Seymour, in the county of Wayne and State of Iowa, have invented a new and useful Marker for Corn-Planters, of which the following is a specification.

My object is to provide an adjustable marker for corn-planters adapted to be mounted on the runner-frame in such a manner that it will be immediately in front of the driver's seat and the mechanism for elevating it and retaining it inoperative and also for reversing it will be within reach of a person on the driver's seat, so that it can be readily raised and held stationary to facilitate turning about at the end of a trip across a field and also readily lowered to mark lines for guiding return trips.

My invention consists in the construction, arrangement, and combination of parts, as hereinafter set forth, pointed out in my claims, and illustrated in the accompanying drawings, in which—

Figure 1 is a top view of a corn-planter carriage, showing my invention applied and in its normal elevated and inoperative position ready to be lowered and shifted to the right or left at the will of the driver on the seat located on the rear portion of the carriage. Fig. 2 is a front view of the carriage and adjustable marker mounted thereon. Dotted lines indicate the position of the marker when lowered as required to produce a continuous furrow in the ground as the carriage is advanced across a field. Fig. 3 is a perspective view of one of the metal markers adapted to be fixed to a straight bar pivotally connected with the runner-frame. Fig. 4 is an enlarged detail view of the top of the pulley-bearer adapted to be fixed onto the rear end portion of the pole, as shown in Fig. 2.

The letter A designates the pole of the carriage, and B the front cross-bar of the runner-frame.

C is a pulley-bearer fixed on top of the rear end portion of the pole, and $d$ and $d'$ are direction-pulleys mounted in the top of the pulley-bearer, as shown, or in any suitable way, as required for directing cords in reverse ways.

H is a straight bar, preferably hard wood, three times as long as the space between the runners or the space between parallel rows. At each end of the bar is fixed a marker $H^2$, adapted to make a continuous furrow in the ground when lowered, as indicated by dotted lines in Fig. 2. The bar is pivotally connected with the cross-bar B of the runner-frame by means of straight uprights K, pivoted at their lower ends to the ends of said cross-bar and at their upper ends to the bar H, preferably by means of eyebolts $l$, in such a manner that they can swing alternately right and left in a vertical plane or be retained perpendicular at the pleasure of the operator on the seat.

A cord $m$ is fixed at its ends to the eyes of the bolts $l$ and extended rearward to be detachably and adjustably connected with a hand-lever $n$ or other vertical projection on the carriage-frame, so located that it will be within reach of the driver on the seat. A ring $r$, fixed to the cord, can be readily slipped over the top of the lever $n$ and the doubled portion of the cord in rear of the ring wrapped around the lever as required for fastening the rope to the lever, to thereby retain the bar H and markers $H^2$ elevated and inoperative.

To lower the marker, simply free the cord $m$ from the lever and relax the handhold from one part of the doubled portion thereof and pull on the other part as required to swing the marker into an operative position, as indicated by dotted lines in Fig. 2. It is obvious the marker may be thus thrown to the right or left of the carriage at the will of the operator and as required to be reversed in turning about at each end of a field.

Heretofore a straight bar carrying markers on its ends has been adjustably connected with a carriage-frame in rear of the driver's seat; but in no instance has a straight bar carrying markers on its ends been pivotally connected with a runner-frame and operative mechanism combined therewith in front of the driver's seat and within plain sight and reach of a person on the seat, as contemplated by my invention, for the purpose of facilitating the marking required for planting straight and equidistant rows.

Having thus described the purpose, construction, application, and operation of my invention, its practical utility will be readily understood by persons familiar with the art to which it pertains, and what I claim as new, and desire to secure by Letters Patent, is—

1. In a marker attachment for corn-planters, a straight bar having fixed devices on its ends for making furrows in the ground, uprights pivotally connected with the bar at equal distances from its ends and also pivotally connected with the front cross-bar and corner portions of the runner-frame and means in front of and within reach of the operator on the seat for retaining said uprights perpendicular and swinging them in reverse ways in the manner set forth for the purposes stated.

2. A marker attachment for corn-planters comprising a straight bar, devices for opening furrows in the ground fixed to the ends of said bar, uprights pivoted to the front corner portions of the runner-frame and also pivoted to the said straight bar at equal distances from the ends of the bar, a pulley-bearer fixed to the front and center portion of the runner-frame, two direction-pulleys mounted at the top of said bearer, a cord fixed at its ends to the straight bar at equal distances from the ends of said bar and extended rearward toward a driver's seat on the carriage in sight of and within reach of a person on the driver's seat, and means for fastening the doubled portion of the cord to a fixed vertical projection on the carriage, all arranged and combined to operate in the manner set forth for the purposes stated.

LEROY J. LINDSAY.

Witnesses:
  A. M. FORD,
  W. W. ELLIOTT.